United States Patent
Kobayashi

(10) Patent No.: US 7,103,032 B2
(45) Date of Patent: Sep. 5, 2006

(54) TELEPHONE CONTROLLER FOR VOIP

(75) Inventor: Yoshikazu Kobayashi, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 794 days.

(21) Appl. No.: 09/738,981

(22) Filed: Dec. 20, 2000

(65) Prior Publication Data

US 2001/0004361 A1    Jun. 21, 2001

(30) Foreign Application Priority Data

Dec. 21, 1999    (JP)    ................................. 11-362852

(51) Int. Cl.
*H04L 12/66* (2006.01)
*H04L 12/56* (2006.01)
*H04L 12/28* (2006.01)

(52) U.S. Cl. ........................ 370/352; 370/389; 709/249

(58) Field of Classification Search ................ 370/400, 370/401, 389, 475, 352–356; 709/245, 238, 709/249, 250, 227, 229
See application file for complete search history.

(56) References Cited

U.S. PATENT DOCUMENTS

| | | | |
|---|---|---|---|
| 5,825,759 A | 10/1998 | Liu | 370/331 |
| 5,901,352 A | 5/1999 | St-Pierre et al. | 455/426 |
| 6,128,664 A * | 10/2000 | Yanagidate et al. | 709/228 |
| 6,393,017 B1 * | 5/2002 | Galvin et al. | 370/352 |
| 6,400,719 B1 * | 6/2002 | Chimura et al. | 370/395.31 |
| 6,496,867 B1 * | 12/2002 | Beser et al. | 709/245 |
| 6,563,824 B1 * | 5/2003 | Bhatia et al. | 370/392 |
| 6,683,871 B1 * | 1/2004 | Lee et al. | 370/356 |
| 6,731,642 B1 * | 5/2004 | Borella et al. | 370/401 |
| 2002/0191576 A1 * | 12/2002 | Inoue et al. | 370/338 |

FOREIGN PATENT DOCUMENTS

| | | |
|---|---|---|
| JP | 10-13471 | 1/1998 |
| JP | 11-122285 | 4/1999 |
| JP | 11-284667 | 10/1999 |

OTHER PUBLICATIONS

Droms, R., "Dynamic Host Configuration Protocol", Oct. 1993, IETF, RFC 1531, pp. 1-41.*
Japanese Office Action dated Mar. 19, 2003 with English translation of pertinent portions.
Canadian Office Action dated Jan. 22, 2003.
Japanese Office Action dated Mar. 31, 2004 with English translation of pertinent portions.

* cited by examiner

*Primary Examiner*—Seema S. Rao
*Assistant Examiner*—Robert C. Scheibel, Jr.
(74) *Attorney, Agent, or Firm*—Whitham, Curtis, Christofferson & Cook, PC

(57) ABSTRACT

A telephone controller according controls a plurality of telephones connected to the Internet via a LAN. The telephone controller includes an IP address allocating circuit which allocates a private IP address to each of the telephones. A memory in the controller stores a table indicating a correspondence between IDs of the plurality of telephones and the private IP addresses. A control circuit controls communication between the plurality of telephones and the Internet using the private IP addresses, where the ID includes a domain name of the telephone controller and identification information.

8 Claims, 7 Drawing Sheets

| No. | ID | IP ADDRESS | EXTENSION TELEPHONE No. | USER NAME |
|---|---|---|---|---|
| 1 | kobayashi100@soho-ip.abc.co.jp | XXX.XXX.XXX.001 | 100 | kobayashi |
| 2 | koike101@soho-ip.abc.co.jp | XXX.XXX.XXX.010 | 101 | koike |
| --- | ---------------------- | ------------ | --- | |

| No. | ID | IP ADDRESS | EXTENSION TELEPHONE No. | HISTORY | REMARKS |
|---|---|---|---|---|---|
| 1 | kobayashi100@soho-ip.abc.co.jp | XXX.XXX.XXX.001 | 100 | | |
| 2 | koike101@soho-ip.abc.co.jp | XXX.XXX.XXX.010 | 101 | | |
| -- | ------------------- | ------------ | --- | | |

… 
TELEPHONE CONTROLLER FOR VOIP

BACKGROUND OF THE INVENTION

1. Field of the Invention

The present invention relates to a telephone controller for VoIP.

2. Description of the Related Art

A conventional telephone service using a part or all of a communication line for packet communication, especially, a telephone service for packet communication over the Internet (IP network), is called VoIP (Voice over IP). Unlike a conventional line switching procedure for a line switched network, VoIP is based on TCP/IP. A telephone also makes a call based on TCP/IP. That is, a calling telephone sends voice information, split into packets based on TCP/IP, to a receiving telephone. On the other hand, communication via VoIP requires the management of global IP addresses allocated to the telephones. This is because a global IP address must be globally unique.

A rapid increase in the number of Internet terminals produces some problems; for example, the available global IP addresses become insufficient, and an increased number of globally-registered IP addresses makes the management of global IP addresses more complex. For example, when a plurality of telephones are connected to the Internet via a LAN, it is difficult to allocate a globally-unique IP address to each telephone in the LAN.

To solve this problem, a private IP address is assigned to each telephone in a LAN and the address is converted between the private IP address and the global IP address. This method requires a router with the network address translator (NAT) function to be installed between the LAN and the Internet to allow the NAT to translate the private IP address of each telephone to a global IP address. This router, however, prevents external units from directly accessing the terminals in the LAN to ensure security. This mechanism is called a firewall. Therefore, the NAT function, once installed, allows a telephone in the LAN to make a call to an external telephone over the Internet but prevents an external telephone connected to the Internet from directly making a call to a telephone in the LAN. That is, although some persons outside the LAN should be allowed to make a call to a telephone in the LAN, the conventional system does not allow it. In addition, an external person cannot make a call to a telephone in the LAN over the Internet even if he or she who knows its private IP address because the address is not registered with the Internet.

SUMMARY OF THE INVENTION

Object of the Invention

It is an object of the present invention to provide a telephone controller which allows an external telephone connected to the Internet to make a direct call to a telephone in a LAN.

SUMMARY OF THE INVENTION

A telephone controller according to the present invention controls a plurality of telephones connected to the Internet via a LAN, the telephone controller comprising:

an IP address allocating circuit which allocates a private IP address to each of the plurality of telephones;

a memory in which a table indicating a correspondence between IDs of the plurality of telephones and the private IP addresses is stored; and a control circuit which controls communication between the plurality of telephones and the Internet using the private IP addresses, wherein the ID includes a domain name of the telephone controller and identification information.

DETAILED DESCRIPTION OF THE PREFERRED EMBODIMENTS

Some embodiments of the present invention will be described in detail by referring to the attached drawings.

Figures 1, 2:
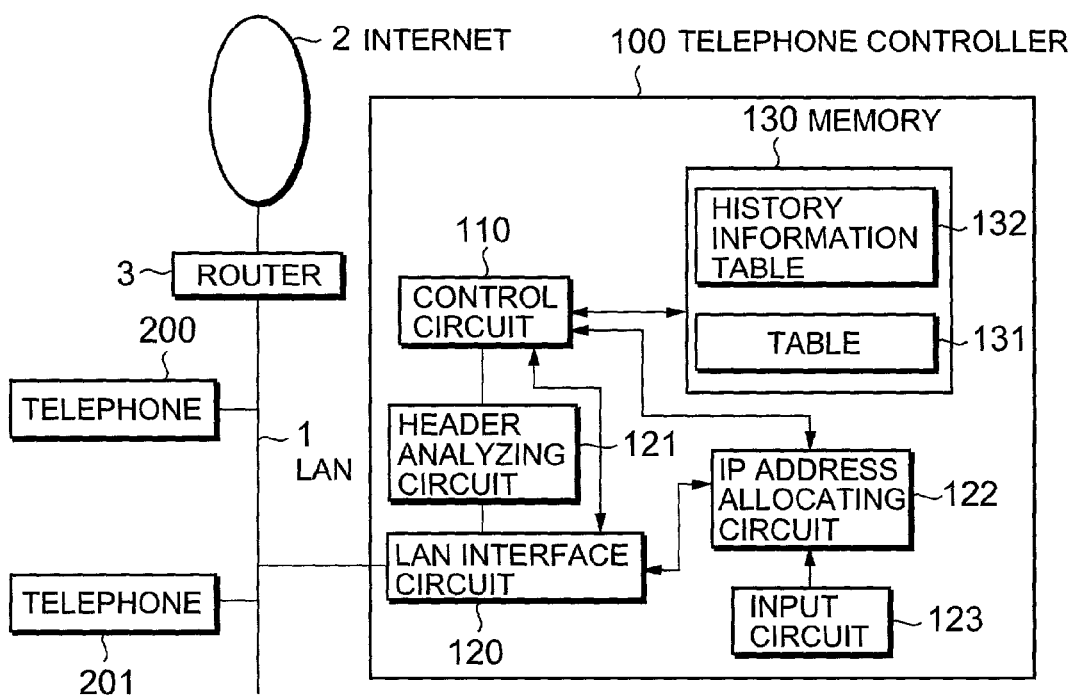
FIG. 1 is a block diagram showing a first embodiment of a telephone controller according to the present invention.
FIG. 2 is a diagram showing the contents of a table stored in the memory of the telephone controller shown in FIG. 1.

FIG. 1 is a block diagram showing an embodiment of the present invention.

Referring to FIG. 1, a telephone controller 100 controls telephones 200 and 201 via a LAN interface circuit 120. The telephone controller 100 comprises a control circuit 110 executing TCP/IP, an IP address allocating circuit 122 allocating private IP addresses to the telephones 200 and 201 in response to an instruction from the control circuit 110, a header analyzing circuit 121 analyzing the header of an IP packet received from LAN1, and a memory 130 storing therein a table 131 representing the correspondence among an ID, a private IP address, an extension telephone number, and a user name. The ID is represented in the form (user name) (extension telephone number)@(domain name), for example, kobayashi100@soho-ip.abc.co.jp. The user name is the name of a user of the telephone 200 or 201, and the domain name "soho-ip.abc.co.jp" is the domain name of the telephone controller 100 on the Internet. The user name and the extension telephone number are used to identify a telephone to be controlled by the telephone controller 100. The ID, the extension telephone number, and the user name are entered by the user using an input circuit 123. LAN1 is a LAN built around a known technology such as 10BASE-T or 100BASE-TX. Although two telephones are used in FIG. 1, three or more may also be used.

The private IP address of the telephone 200 or 201 is created according to the procedure described below.

When the telephone 200 connects to LAN1 and the synchronization between the telephone 200 and the telephone controller 100 is established according to the LAN communication protocol, the LAN interface circuit 120 informs the control circuit 110 that the telephone 200 may communicate with the telephone controller 100. In response to this information, the control circuit 110 outputs an IP address allocation instruction to the IP address allocating circuit 122. Upon receiving this instruction, the IP address allocating circuit 122 creates a private IP address ("XXX.XXX.XXX.001" (X is any number)) for the telephone 200 made available for communication and sends the created address to the control circuit 110. The private IP address is created automatically by the IP address allocating circuit 122 each time the telephone moves from the inactive state to the active state. The created private IP address of the telephone 200 is sent to the telephone 200. The control circuit 110 associates the private IP address allocated to the telephone 200 with the ID, extension telephone number, and user name and stores the created entry in the table 131. The data structure of the table 131 is shown in FIG. 2. The private IP address of the telephone 201 is also created in the same manner according to the procedure described above.

Next, the procedure for updating the table 131 will be described.

An ID, extension telephone number, and user name stored in the table 131 may be updated via the input circuit 123 of the telephone controller 100. They may also be updated by an instruction from the telephone 200 or 201. The following describes the method.

First, the telephone 200 sends an ID registration request message to the telephone controller 100. The ID registration request message is sent in the format of the packet shown in FIG. 3. This packet comprises an IP address 310, a header 311, and an ID 312. The IP address 310 is composed of the private IP address of the telephone 200 which is the source and the IP address of the telephone controller 100 which is the destination. The private IP address is the IP address notified by the telephone controller 100. The header 311 contains control information such as the ID registration command and the data length. The ID 312 contains the ID of the telephone 200. The user of the telephone 200 stores, in advance, his or her own ID into the memory of the telephone 200.

The telephone 200 generates an ID registration request message, for example, when the user enters a request from the operation panel of the telephone, when the telephone controller 100 notifies an IP address, each time a predetermined time elapses, when the power is turned on, or when an ID is set.

Figures 3, 4:
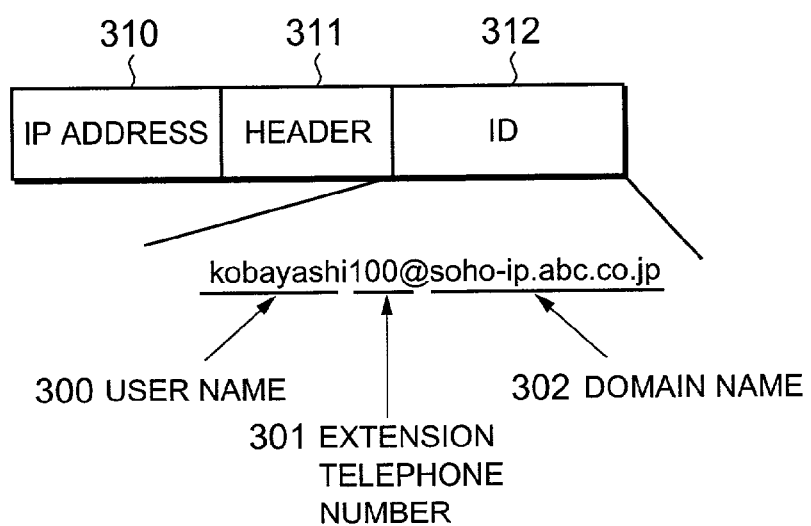
FIG. 3 is a diagram showing a registration request IP packet created by the telephone in FIG. 1.
FIG. 4 is a diagram showing the contents of a history information table stored in the memory of the telephone controller shown in FIG. 1.

The LAN interface circuit 120 receives a packet, shown in FIG. 3, from the telephone 200. The LAN interface circuit 120 sends the received packet to the control circuit 110 via the header analyzing circuit 121. Then, the control circuit 110 obtains the source IP address (private IP address of the telephone 200) and the ID from the packet. In addition, the control circuit 110 obtains the user name and the extension telephone number from the obtained ID. Then, the control circuit 110 accesses the table in the memory 130 to update the ID, extension telephone number, and user name corresponding to the obtained private IP address. To update either the user name or the extension telephone number stored in the ID, only a user name 300 or an extension telephone number 301 may be stored in the ID 312.

Even when the office is rearranged and telephone user changes from one person to another, the function described above allows the new user to use the telephone to update the table in the telephone controller. Also, even when the telephone is replaced, the ID that was set in the old telephone may be set in the new telephone. This makes telephone replacement easy. Setting the same ID in a plurality of telephones enables one person to use the plurality of telephones.

Next, a telephone call between a telephone in a LAN and an external telephone will be described by referring to FIG. 7.

Figure 7:
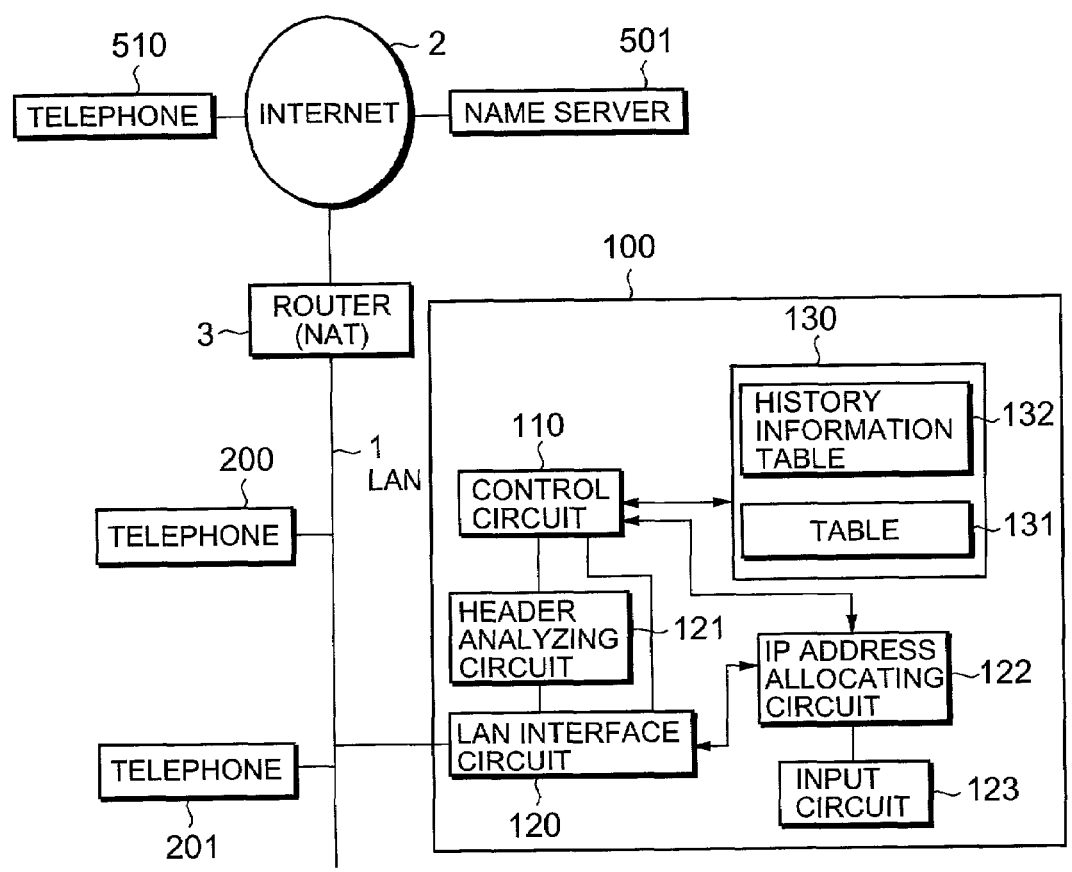
FIG. 7 is a block diagram showing the embodiment in which external telephones and a name server are connected to the Internet shown in FIG. 1.

FIG. 7 shows a configuration in which a telephone 510 with the IP communication function is connected to the Internet 2. The telephone 510 is connected to the Internet 2, either directly or via a LAN. Or, as in a dial-up connection configuration, the telephone 510 may dial up the Internet service provider to temporarily connect to the Internet.

A name server 501 is an IP address and domain name management server such as Domain Name Server System (DNS) or CHAT. This name server is connected to the Internet 2. Except the telephone 510 and the name server 501, the configuration shown in FIG. 7 is similar to that shown in FIG. 1.

Figure 5:
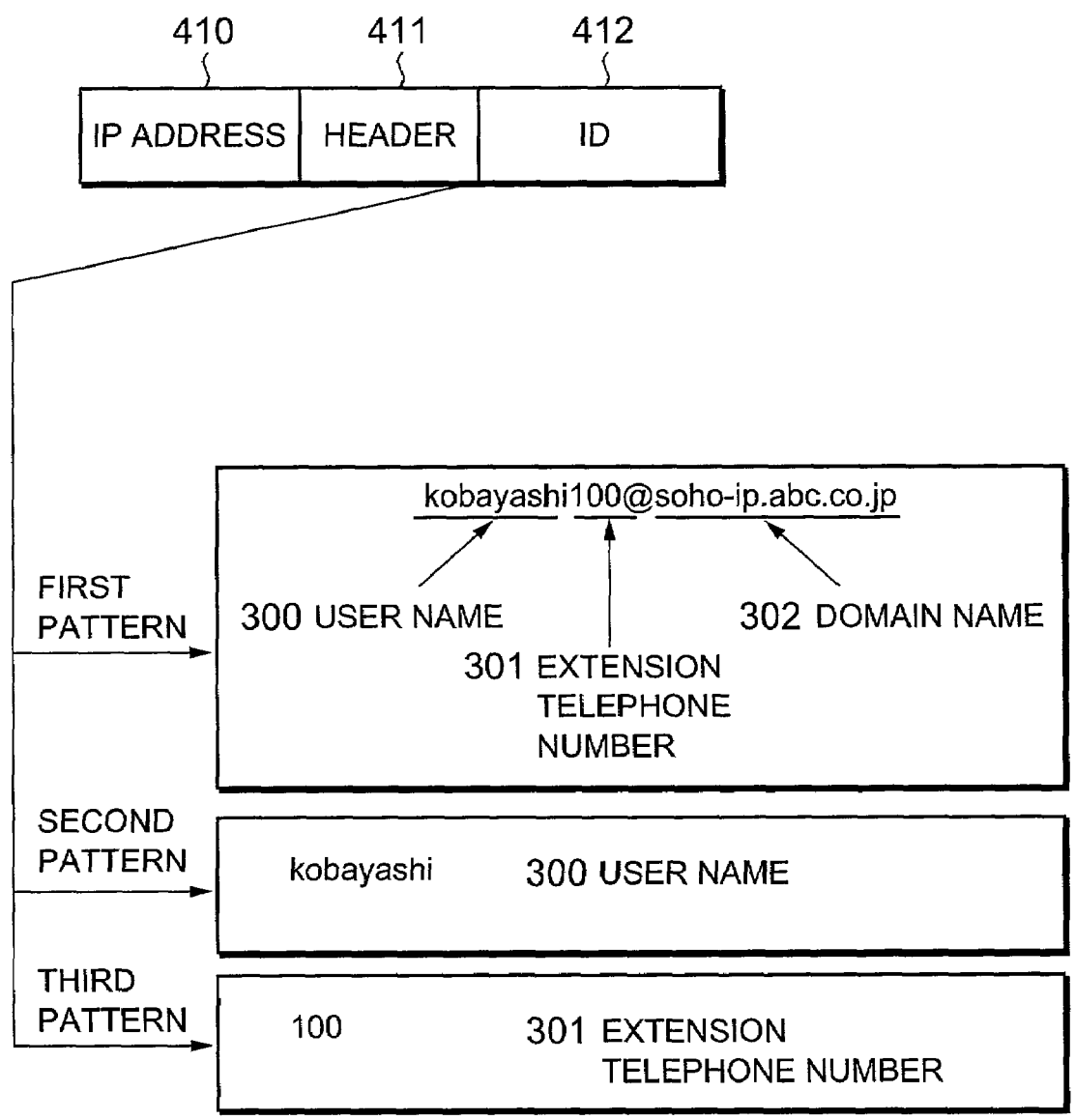
FIG. 5 is a block diagram showing an IP packet created by the telephone shown in FIG. 1.
Figure 8:
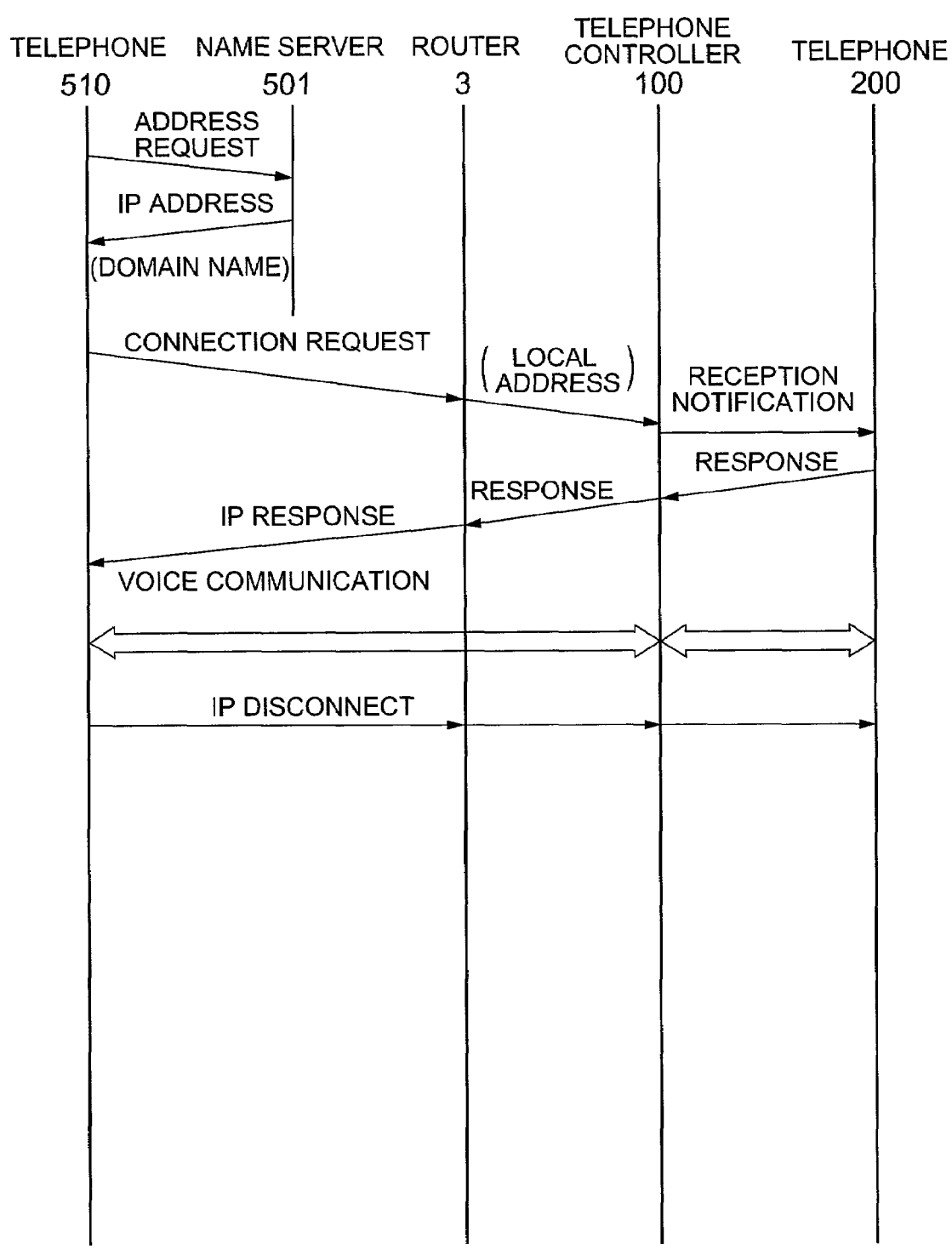
FIG. 8 is a sequence diagram showing a communication operation between an external telephone and a telephone in a LAN.

FIG. 8 is a diagram showing the operation sequence in which the telephone 510 connected to the Internet makes a call to the telephone 200 in the LAN. When the user enters the ID of the telephone 200 into the telephone 510, the telephone 510 extracts the domain name from the ID and sends an address request to the name server 501. This domain name is "soho-ip.abc.co.jp" which is the domain name of the telephone controller 100 controlling the telephone 200. The name server 501 sends the global IP address, corresponding to the domain name, to the telephone 510. The telephone 510 creates an IP packet with the received global IP address as the destination IP address and sends the packet to a router 3. The IP packet that is sent is shown in FIG. 5. The global IP address of the telephone controller 100 is stored in an IP address 410 shown in FIG. 5, while the ID "kobayashi100@soho-ip.abc.co.jp" of the telephone 200 is stored in an ID 412. The router 3 sends the IP packet received from the telephone 510 to the telephone controller 100. This IP packet is sent to the header analyzing circuit 121 via the LAN interface circuit 120. The header analyzing circuit 121 analyzes the header of the IP packet and then sends the ID stored in the ID 412 to the control circuit 110.

The control circuit 110 searches the table 131 with the user name or the extension telephone number contained in the ID to obtain the private IP address of the telephone 200. Then, the control circuit creates a reception notification packet with the private IP address of the telephone 200 as the destination IP address and sends the created packet to the telephone 200 via the LAN interface circuit 120. This causes a control circuit 220 (shown in FIG. 6) in the telephone 200 to ring the bell. When the user of the telephone 200 lifts the telephone receiver, the telephone 200 creates a response packet and sends the created response packet to the telephone controller 100. The telephone controller 100 sends the response packet back to the telephone 510 via the Internet 2.

After that, IP packets containing voice is transferred between the telephone 510 and the telephone 200. When the call is finished, the telephone 510 sends a disconnect command packet to the telephone controller 100, and the line disconnection operation begins. If the user of the telephone 510 does not know the ID of the telephone 200, only the domain name obtained from the name server 501 may be stored in the ID field of the packet shown in FIG. 5. This causes the telephone controller 100 to send the packet to all telephones it controls. In this case, the call is executed between the telephone which answers the call first and the telephone 510.

Next, the following describes how the telephone 200 makes a telephone call to the telephone 201. FIG. 5 shows the packet the telephone 200 is to send to the telephone controller 100. In this case, the destination telephone 201 is specified in one of the following three methods. In the first method, the user name 300, the extension telephone number 301, and a domain name 302 of the telephone 201 are stored in the ID 412. In the second method, only the user name 300 of the telephone 201 is stored in the ID 412. In the third method, only the extension telephone number is stored in the ID 412. In the IP address 410, the global IP address of the telephone controller 100 and the private IP address of the telephone 201 are stored.

The telephone controller 100 sends to the control circuit 110 the ID when the ID 412 of the received packet is the pattern used in the first method, the user name when the ID 412 is the pattern used in the second method, and the extension telephone number when the ID 412 is the pattern used in the third method.

The control circuit 110 searches the table 131 with the ID 412 to obtain the private IP address of the telephone 201. When the table 131 stores a plurality of private IP addresses for one ID, the control circuit 110 obtains the plurality of private IP addresses. In this case, a plurality of telephones will be called.

The control circuit 110 creates a reception notification packet with the obtained private IP address as the destination IP address and sends the created packet to the LAN interface circuit 120. The LAN interface circuit 120 sends the packet to the telephone 201 and rings the telephone 201. When the user of the telephone 201 lifts the receiver, the telephone 201 creates a response packet and sends it to the telephone controller 100. The telephone controller 100 sends the response packet to the telephone 200.

After receiving the response packet, the telephone 200 executes the call according to the RTP protocol (standard protocol for transferring voice and image data in real time) Once the call is started according to the RTP protocol, packets containing voice information are transferred, not via the telephone controller 100, but directly between the telephone 200 and the telephone 201.

Figure 6:
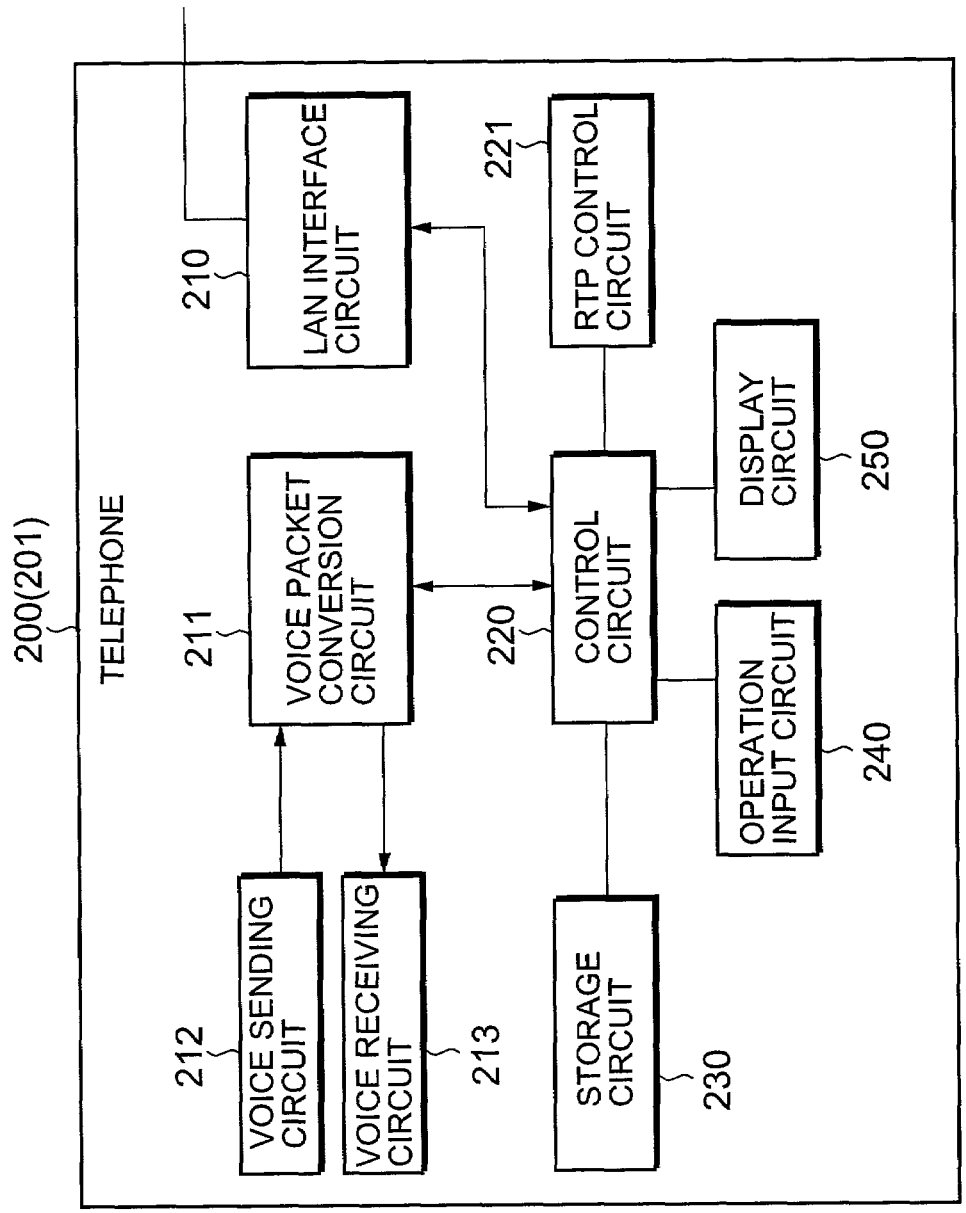
FIG. 6 is a diagram showing the configuration of the telephone shown in FIG. 1.

Next, the configuration of the telephones 200 and 201 will be described. FIG. 6 is a block diagram showing the configuration of the telephone 200 (201). The telephone 200 (201) comprises a LAN interface circuit 210 connected to LAN1 and executing the LAN communication protocol, a control circuit 220 executing TCP/IP for overall control, an RTP control circuit 221 controlling the RTP protocol described above, a voice packet conversion circuit 211 processing voice during communication, a voice sending circuit 212, a voice receiving circuit 213, a storage circuit 230 connected to the control circuit 220, an operation circuit 240, and a display circuit 250.

The voice packet conversion circuit 211 encodes voice signals from the voice sending circuit 212 and converts the signals into packets for transmission to the control circuit 220. In addition, the voice packet conversion circuit 211 decodes voice packets sent from the control circuit 220 and sends the decoded signals to the voice receiving circuit 213.

The control circuit 220 converts information packets, such as voice packets, into packets according to the TCP/IP protocol and sends the created packets to the LAN interface circuit 210. In addition, the control circuit 220 analyzes packets sent from the LAN interface circuit 210 and, based on the analysis result, controls the components of the telephone. For example, the control circuit 220 receives a private IP address, an extension telephone number, and an ID allocated by the IP address allocating circuit 122 of the telephone controller 100 and stores them into the storage circuit 230. The control circuit 220 also stores table information transferred from the telephone controller 100 into the storage circuit 230. In addition, the control circuit 220 causes the display circuit 250 to display allocated private IP addresses and IDs. When the user presses the buttons of the operation circuit 240 or uses the keyboard to create an ID, the control circuit 220 sends the ID to the telephone controller 100. In this case, the control circuit 220 creates a packet shown in FIG. 3 or FIG. 5 and sends the created packet to the telephone controller 100 via the LAN interface circuit 210. In addition, in response to a reception notification packet, the control circuit 220 rings the bell.

Next, the following describes how information stored in the internal tables is transferred. The control circuit 110 reads the table 131, shown in FIG. 2 and prepared in the telephone controller 100, and sends information stored therein to the telephone 200 via the LAN interface circuit 120. This allows the telephone 200 to store therein information such as the ID and IP address of some other telephone, enabling the telephone 200 to make a call to that telephone.

Next, the following describes how telephone call history information is stored in the memory 130 of the telephone controller 100. Telephone history information is created by the control circuit 110.

A history information table 132 in the memory 130 shown in FIG. 1 contains history information such as the party, call charge, call time for each call of each ID of the telephones 200 and 201. FIG. 4 shows the history information table containing such history information with history information stored for each ID. Even if the IP address allocating circuit 122 changes the private IP address of a telephone, the history information on the telephone is constantly kept managed by ID and stored in the history information table 132 to allow history to be kept track for each ID.

The user name in the ID, though a person's name in the description described above, may be the name of a division in which the telephone is installed. For example, the user name may be "general-affairs". In this case, the ID is "general-affairs100@soho-ip.abc.co.jp". In addition, the user name may be a two-part name such as "division-name+ user name". In this case, the user name in the ID is "general-affairs kobayashi", "sales kobayashi", etc. In addition, the same extension telephone number may be used with a plurality of user names. For example, the user name may be "general-affairs kobayashi100@ . . . ", "general-affairs tanaka100@ . . . ", etc. In this case, one telephone is shared by a plurality of persons.

Next, a second embodiment of the present invention will be described with reference to the attached drawings.

Figure 9:
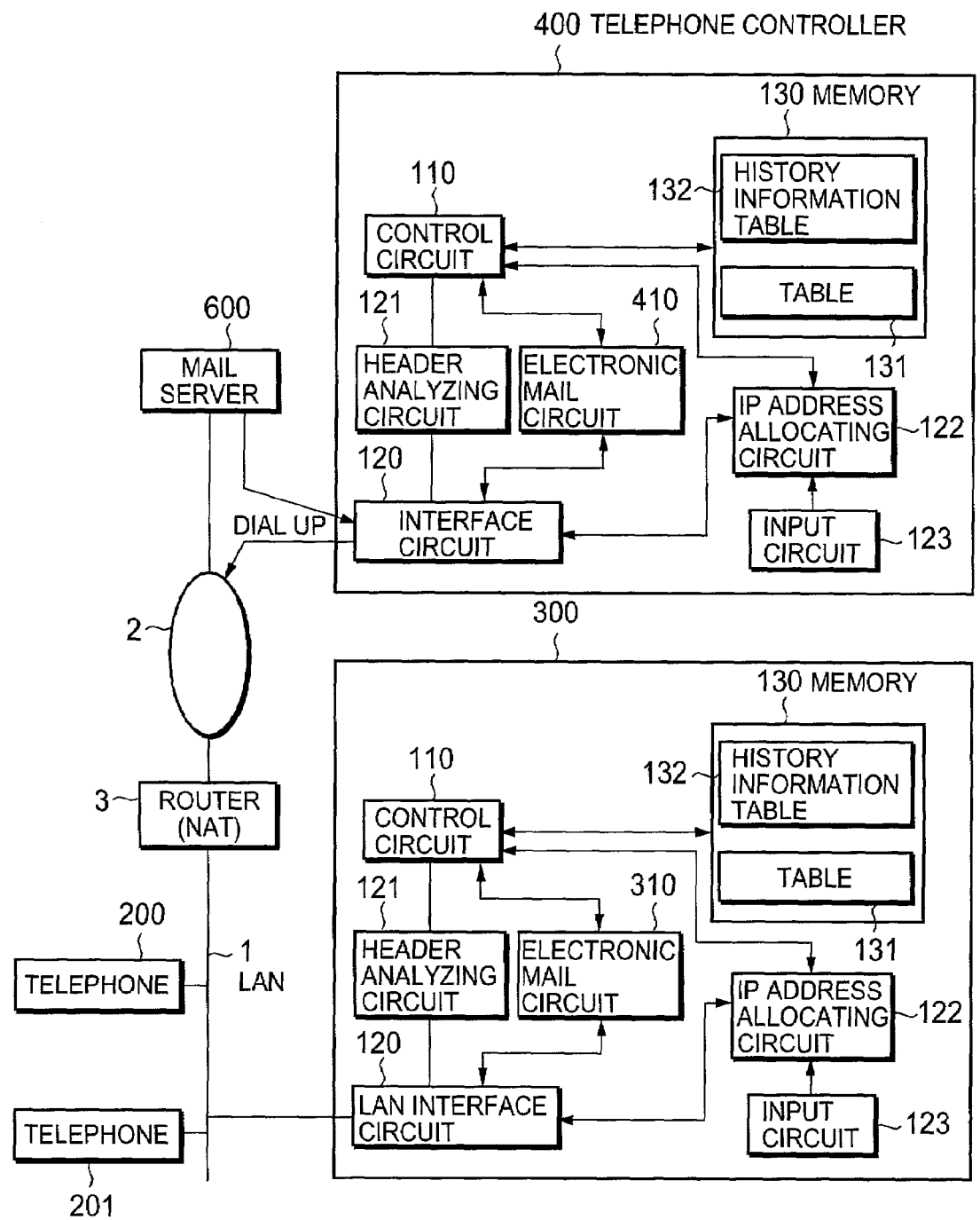
FIG. 9 is a block diagram showing a second embodiment of the telephone controller according to the present invention.

FIG. 9 is a block diagram showing the second embodiment of the present invention. In this embodiment, telephone controllers 300 and 400 each can send or receive information in the table 131 via electronic mail. That is, the telephone controllers 300 and 400 comprise electronic mail circuits 310 and 410, respectively, which execute the electronic mail protocol.

The telephone controller 300 is connected constantly to the Internet 2 via LAN1, while the telephone controller 400 connects to the Internet 2 via a dial-up connection. The telephone controlled by the telephone controller 400 is not shown in FIG. 9.

The telephone controller 400, which connects to the Internet 2 via a dial-up connection, cannot receive a call directly from the Internet 2. Therefore, in this embodiment, the electronic mail function is used to transfer the information stored in the table 131.

The information stored in the table 131 is sent from the telephone controller 300 to the telephone controller 400 as described below.

When the electronic mail circuit 310 in the telephone controller 300 sends a transfer instruction to the control circuit 110, the control circuit 110 reads information from the table 131 and transfers it to the electronic mail circuit 310. The electronic mail circuit 310 sends, as electronic mail information, the information of the table 131 to a mail server 600 of the Internet 2 via the LAN interface circuit 120, LAN1, and the router 3. The mail server 600 stores the received electronic mail information therein.

After that, if the telephone controller 400 is ready to receive mail, the mail server 600 sends the stored electronic mail information to the interface circuit 120 in the telephone controller 400.

The electronic mail information is sent to, and stored in, the table 131 in the telephone controller 300 via the interface circuit 120, electronic mail circuit 410, and control circuit 110.

Then, the user of a telephone (not shown) under control of the telephone controller 400 can enter the ID of the telephone 200 or 201 from his or her telephone to make a request to connect to the telephone 200 or 201. The connection operation is the same as when an external telephone makes a call.

Next, the following describes how the information stored in the table 131 is sent from the telephone controller 400 to the telephone controller 300.

When the electronic mail circuit 410 in the telephone controller 400 sends a transfer instruction to the control circuit 110, the control circuit 110 requests the interface circuit 120 to make a dial-up connection to the Internet 2.

When a dial-up connection to the Internet 2 is established, the control circuit 110 reads the table 131 and transfers the information to the electronic mail circuit 410. The electronic mail circuit 410 sends, as electronic mail information, the information of the table 131 to the mail server 600 of the Internet 2 via the interface circuit 120. The mail server 600 stores the received electronic mail information therein.

After that, the mail server 600 sends the stored electronic mail information to the LAN interface circuit 120 in the telephone controller 300 via the router 3 and LAN1.

The electronic information is sent to, and stored in, the table 131 in the telephone controller 400 via the LAN interface circuit 120, electronic mail circuit 310, and control circuit 110.

It should be noted that a telephone under control of the telephone controller 300 cannot send a connection request over the Internet to a telephone under control of the telephone controller 400 because the telephone controller 400 is connected to a dial-up line.

As a modification of the second embodiment, the information stored in the table may be transferred using the Internet LDAP (Lightweight Directory Access Protocol defined by RFC 2251–2256) instead of the electronic mail protocol.

As described above, the ID of each telephone includes the global domain name assigned to the telephone controller, and the telephone controller manages the telephones by maintaining the correspondence between IDs, each including the domain name, and IP addresses. In this way, the present invention solves the problem of IP address insufficiency.

Including the global domain name in the ID enables an external telephone to search for an address. This makes it easy to search for a telephone party when the user makes a call via the Internet.

The telephone controller manages the correspondence between the IP addresses of the telephones in the LAN and the IPs. Therefore, the present invention has the following effects:

(1) The user of a telephone may be identified with his or her ID even if the telephone is turned on or off, the telephone is connected to or disconnected from the LAN, the seating is changed or the office is shifted from one floor to another, or a line error occurs.

(2) One extension telephone unit may provide a plurality of persons with a unified service.

(3) The history or management information may be kept correctly even if the IP address of a telephone is changed.

(4) With one ID allocated to one telephone, a telephone call may be given to the user of that telephone even if the location of the telephone changes.

While this invention has been described in conjunction with the preferred embodiments described above, it will now be possible for those skilled in the art to put this invention into practice in various other manners.

What is claimed is:

1. A telephone controller controlling a plurality of telephones connected to the Internet via a LAN (Local Area Network), said telephone controller allowing an external telephone connected to the Internet to make a direct call to a telephone in the LAN comprising:

an IP (Internet Protocol) address allocating circuit which allocates a private IP address to each of the plurality of telephones;

a memory in which a table indicating a correspondence between IDs (Identifier) of the plurality of telephones and corresponding ones of the private IP addresses is stored; and a control circuit which controls communication between the plurality of telephones and the Internet using the private IP addresses, wherein each of the IDs includes a global domain name registered on the Internet of said telephone controller and identification information composed of a user name and an extension telephone number of the telephone, wherein said memory further stores therein a table indicating a correspondence among an ID, a private IP address, an extension telephone number, and a user name, and wherein said control circuit, in response to a registration request message including one of said IDs, extracts the identification information from said one of said IDs received via the Internet, searches said table with the identification information to obtain the private IP address, and executes communication between a telephone to which the private IP address is allocated and the Internet.

2. The telephone controller according to claim 1 wherein said control circuit notifies the allocated IP address to the telephone.

3. The telephone controller according to claim 1 wherein said memory further stores therein a table indicating communication history information for each ID.

4. The telephone controller according to claim 1 wherein said table is updated in response to a request from the telephone.

5. The telephone controller according to claim 1, further comprising means for receiving the ID, wherein said control circuit stores the ID received from said means for receiving into said memory.

6. The telephone controller according to claim 1, further comprising a transfer circuit which transfers information stored in said table to some other telephone controller.

7. A telephone communication unit composed of a LAN (Local Area Network) connected to the Internet, telephone controllers communicating each other via the LAN, and a plurality of telephones, wherein
each of said telephone controllers allowing an external telephone connected to the Internet to make a direct call to a telephone in the LAN and comprises:
an IP (Internet Protocol) address allocating circuit which allocates a private IP address to each of said plurality of telephones;
a memory in which a table indicating a correspondence between IDs (Identifier) and identification information of said plurality of telephones and corresponding ones of said private IP addresses is stored; and
a control circuit which controls communication between said plurality of telephones and the Internet using the private IP addresses,
wherein each of the IDs includes a global domain name registered on the Internet of said telephone controller and the identification information is composed of a user name and an extension telephone number of the telephone and wherein said memory stores therein a table indicating a correspondence among an ID, a private IP address, an extension telephone number and a user name; and
each of said plurality of telephones includes an input circuit which receives an ID and identification information and sends the ID and the identification information received from said input circuit to said telephone controller, said control circuit, in response to a registration request message including one of said IDs, extracts the identification information from said one of said IDs received via the Internet, searches said table with the identification information to obtain the private IP address, and executes communication between a telephone to which the private IP address is allocated and the Internet.

8. A telephone controller comprising:
a storage section configured to store an IP address allocated by an IP address circuit together with an extension telephone number of each of a plurality of telephones for every ID corresponding to each telephone in said plurality of telephones;
a control section configured to manage said IP address and said extension telephone number for every said ID, and to inform said IP address to a telephone corresponding to said ID; and
a receiving section configured to receive a registration request message from said telephone,
wherein said ID for each telephone includes identification data and a global domain name registered on the Internet, and the identification data of said ID includes a user identification section and an extension telephone number identification section for said extension telephone number of said telephone,
said registration request message includes said ID, and
said control section stores said registration request message received by said receiving section and said extension telephone number included in said ID in said storage section.

* * * * *